June 25, 1946.　　　A. B. SCHULTZ　　　2,402,918
GLIDER LAUNCHING SYSTEM
Filed May 14, 1942　　　4 Sheets-Sheet 1

INVENTOR
ARTHUR B. SCHULTZ
BY Albert M. Austin
ATTORNEY

June 25, 1946.　　　A. B. SCHULTZ　　　2,402,918
GLIDER LAUNCHING SYSTEM
Filed May 14, 1942　　　4 Sheets-Sheet 2

INVENTOR
ARTHUR B. SCHULTZ
BY Albert M. Austin
ATTORNEY

INVENTOR
ARTHUR B. SCHULTZ
BY Albert M. Austin
ATTORNEY

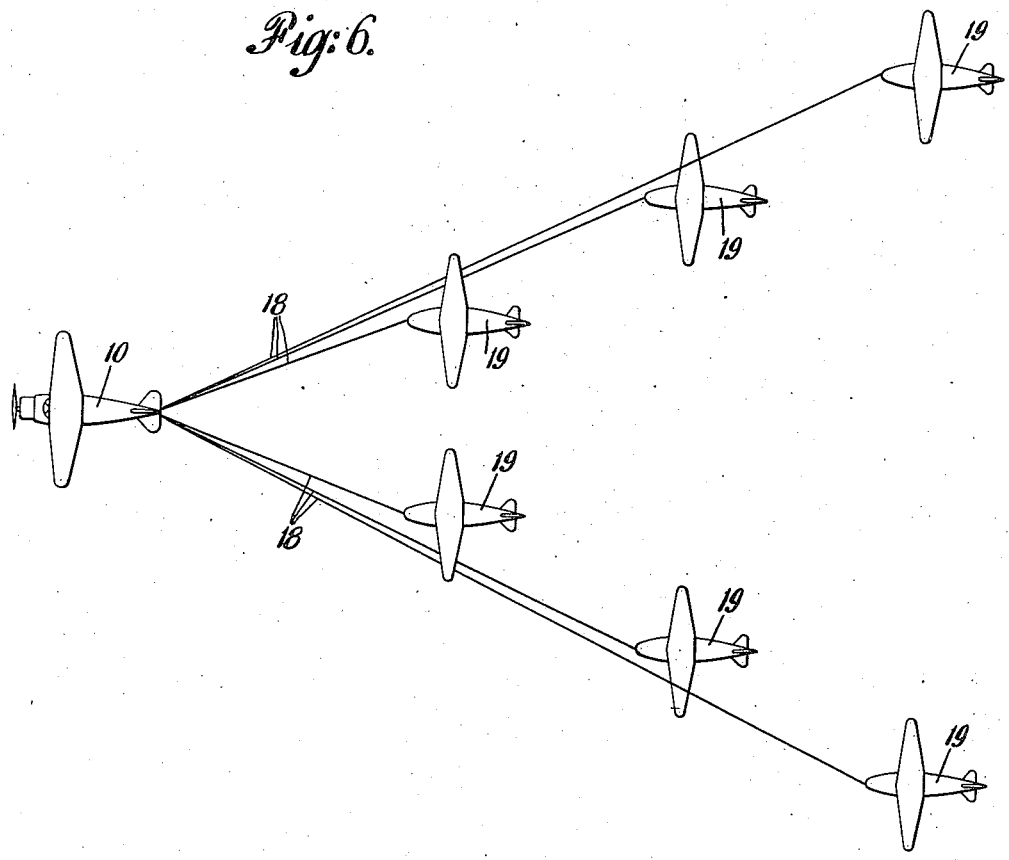
Fig: 6.
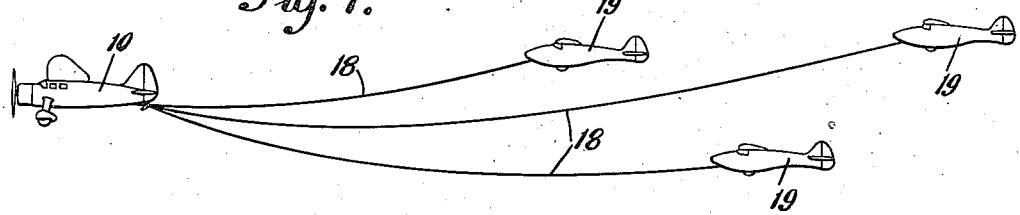
Fig: 7.
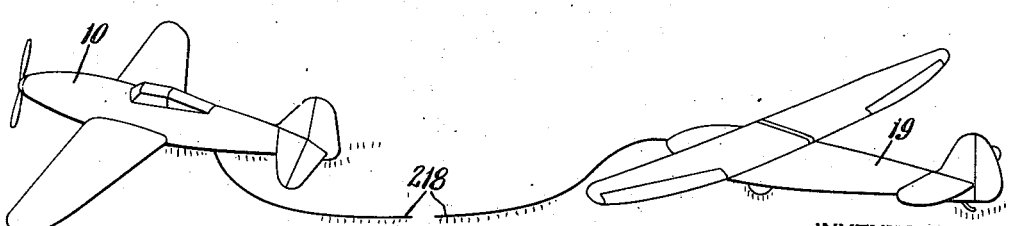
Fig: 8.
INVENTOR
ARTHUR B. SCHULTZ
BY Albert M. Austin
ATTORNEY Patented June 25, 1946

2,402,918

UNITED STATES PATENT OFFICE 2,402,918

GLIDER LAUNCHING SYSTEM

Arthur B. Schultz, Wilmington, Del., assignor to All American Aviation, Inc., Wilmington, Del., a corporation of Delaware Application May 14, 1942, Serial No. 442,933

10 Claims. (Cl. 244—3)

The invention relates to aviation and more particularly to a process and apparatus for launching and towing gliders by power driven aircraft.

According to a preferred form of the invention, a connection is established between the towing plane and the glider whereby to apply an accelerating force to the glider with minimum shock to the glider, to the tow plane and to the connecting equipment. For limiting the accelerating force an automatic winch is mounted on the glider, said winch automatically paying out line while maintaining a predetermined force on the line to provide time in which to accelerate the glider from stationary position to flying speed. To help absorb the shock, and especially to provide time to permit acceleration of the winch, the connecting line is made from material having, in addition to high tensile strength and high elasticity, long elastic memory. A material having such characteristics may be constructed from synthetic condensation polyamide fibers known commercially as "nylon."

According to the invention, it is preferred to locate the winch on the glider and to provide means whereby the glider pilot may operate the winch. Suitable provision is made whereby the glider pilot may adjust the winch to set the number of relatively free revolutions which the winch may make while the nylon line is accelerating the winch. He may also adjust the brake on the winch which determines the maximum force applied to the nylon line for any pick-up operation. Provision may also be made for reeling in the line after the glider is launched, since the amount of line necessary to launch the glider may be in excess of that convenient or desirable for simple towing purposes.

According to the invention, the glider may be launched by a plane picking it up while flying over the ground station where the glider is located or the glider may be launched by a stationary towing plane, both plane and glider being located on a flying field.

When picking up the glider by a plane in flight no air field is necessary but simply a pick-up station and a relatively clear open space. For example, the pick-up station may comprise two poles set in the ground, supporting on their top a pick-up loop connected to the poles by releasable couplings. The glider is on the ground and is connected to the loop by a line. The towing plane has a depending arm or boom having a grapple or hook and the plane is flown over the ground station to engage the pick-up loop between the poles. The line is automatically paid out by the winch on the glider until the glider is accelerated to the speed of the tow plane.

In case it is desired to tow a series of gliders by the same plane, the line may be transferred from the pick-up hook to another point on the towing plane and the tow plane may return to the station to pick up a second glider, secured to a ground loop, by the same technique used in picking up the first glider. The pilot of the first glider, however, will so manipulate his craft as to reduce the drag thereof on the tow plane while the second glider is being accelerated. Additional gliders may be picked up in the same way.

In some cases, all of the gliders to be picked up may be secured simultaneously to the same ground loop and all of the gliders launched by the same picking-up operation. In this method, the several gliders may be connected by lines of different lengths so that the lines will tighten and apply accelerating force to the gliders one at a time.

When launching a glider by a plane on the ground in methods heretofore used a large airfield was required. In the present invention the tow line may be sufficiently long and so arranged as to give sufficient slack to permit the tow plane to accelerate normally and approach its flying speed to cause the glider to take off. The winch may be so adjusted as to apply sufficient accelerating force to the glider to cause it to fly before the tow plane leaves the ground. After the glider is flying, the glider pilot so manipulates it as to reduce the drag thereof on the tow plane, which permits the tow plane to take off and attain a safe flying speed after which the glider is manipulated to again be towed normally by the tow plane. In case there are additional gliders to be launched by the same tow plane, additional lines of varying lengths may be connected from the tow plane to the additional gliders, these lines being so arranged as to launch the gliders one at a time.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 represents diagrammatically a ground station showing a glider on the ground and an aircraft in flight approaching the ground station about to pick up the glider;

Fig. 6 represents diagrammatically a plan view of one flight formation which the gliders may take behind the towing plane;

Fig. 7 represents diagrammatically a vertical view of the formation illustrated in Fig. 5; and Fig. 8 is a diagrammatic view illustrating the manner of launching a glider by a tow plane on the ground.

Figure 1:
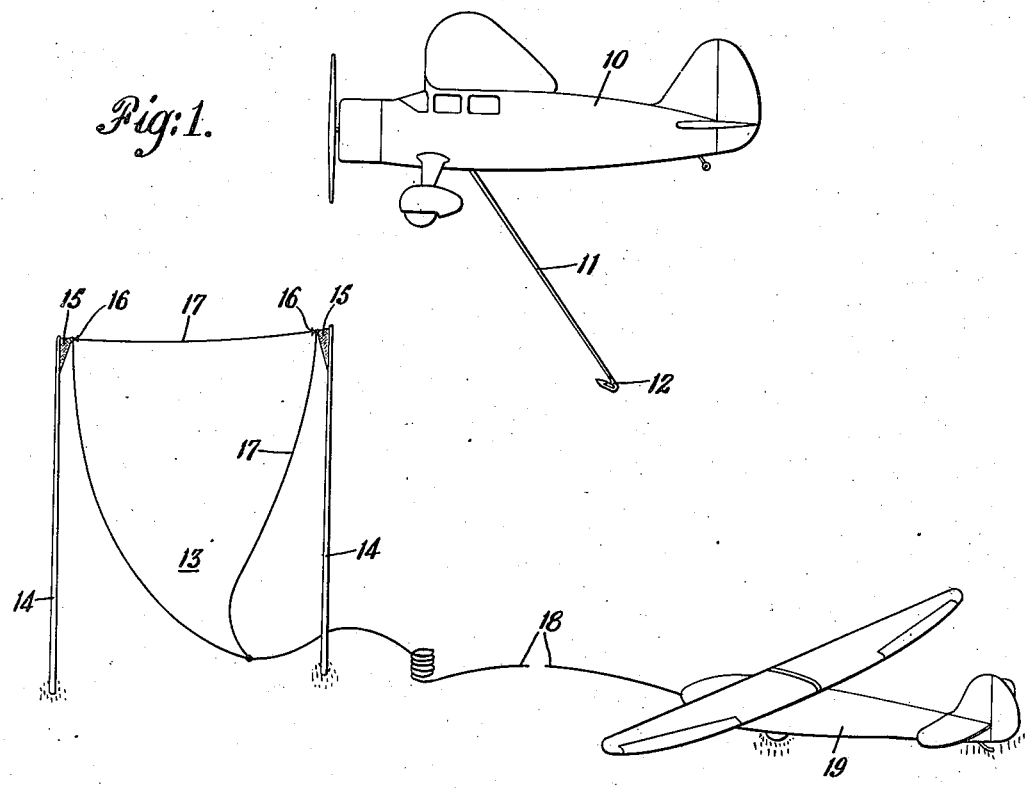

In the following description and in the claims, various details will be identified by specific names for convenience, but they are intended to be as generic in their application as the art will permit.

Like reference characters denote like parts in the several figures of the drawings.

In the drawings accompanying and forming part of this patent, certain specific disclosure of the invention is made for purposes of explanation, but it will be understood that the details may be modified in various respects without departure from the broad aspect of the invention.

Referring now to the drawings, and more particularly to Fig. 1, the towing plane is indicated by 10 and has depending therefrom an arm or boom 11 pivoted to the body of the plane. The boom 11 has a grapple or hook 12. The boom 11 is operated by the pilot of the plane or by a separate pick-up operator, and may be swung from the pick-up or operative position shown in Fig. 1 up within a longitudinal recess in the body of the plane to the storage or inoperative position shown in Fig. 2.

The ground station indicated in general by 13 comprises two poles 14 set in the ground, for example, about 20 feet apart and extending about 20 feet into the air. Secured to the poles 14 are flags 15 having releasable couplings 16 for releasably holding a closed loop 17. The loop 17 has attached thereto a line 18 which extends to the nose of glider 19 shown resting on the ground.

Figure 3:
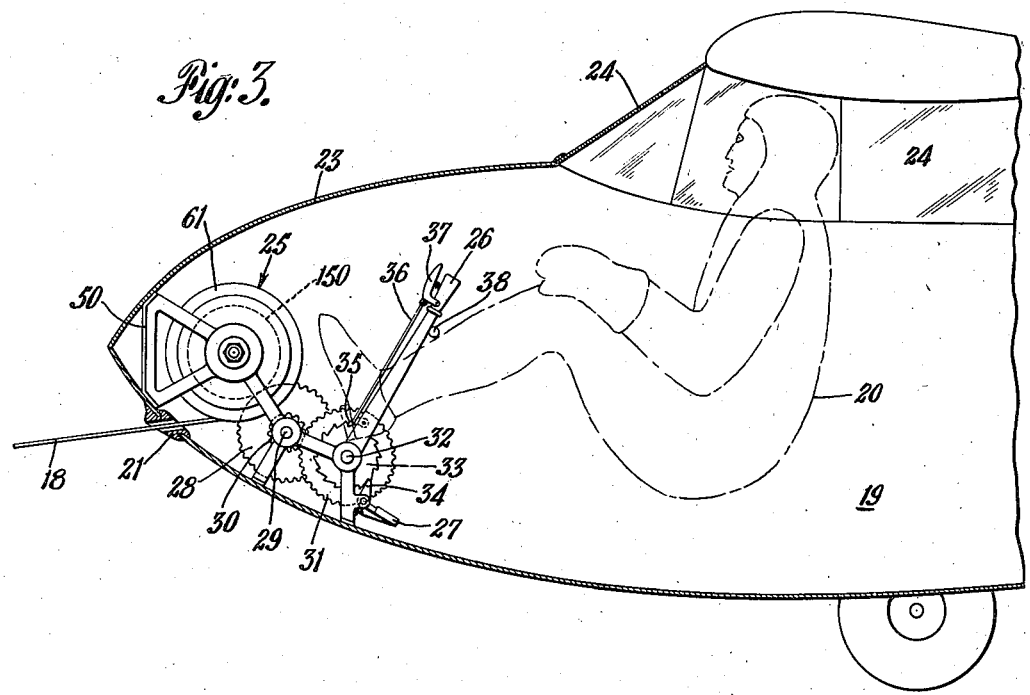
Fig. 3 is a longitudinal section through the nose of the glider illustrating the position of the glider pilot and the construction of the automatic winch.

Referring now to Fig. 3, the glider 19 has a cockpit adapted to seat the pilot indicated by 20, the head of the pilot being surrounded by the usual glass enclosure 24 for visibility. Secured to the framework of the glider 19 and located in the nose 23 of the glider is a winch indicated in general by 25 on which the line 18 is wound. The line 18 passes through an eye 21 and is wound around the winch 25 as shown. The winch is controlled by the pilot 20 who operates a handle 26 and a foot pedal 27 in addition to the standard controls (not shown) for operating a glider.

Figure 4:
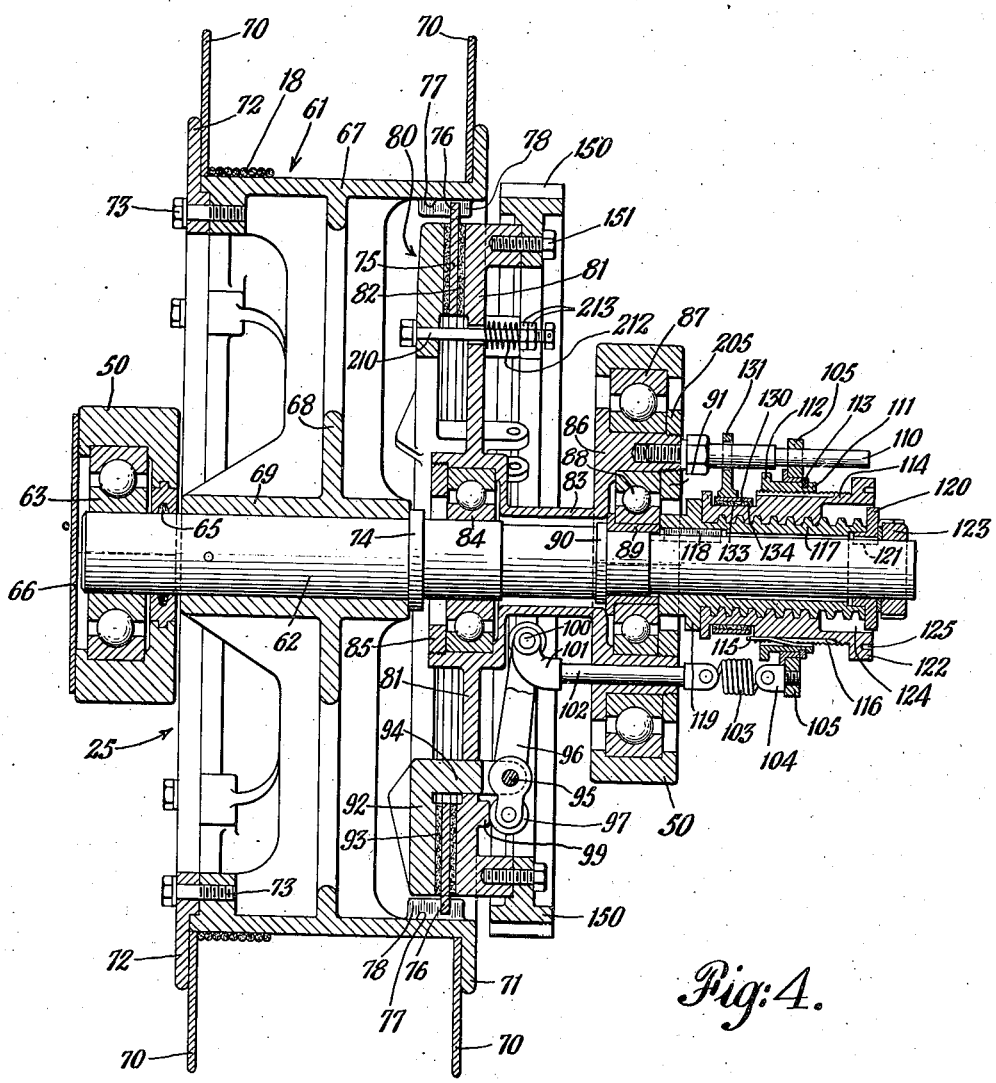
Fig. 4 is a cross section through the axis of the winch.

Referring now also to Fig. 4, the automatic winch 25 comprises a frame 50 in which is journaled a drum 61 having flanges 70 to hold a large number of convolutions of line 18. The drum 61 cooperates with an automatic brake denoted in general by 80 which retards the unreeling of the drum. This automatic winch operates upon the same general principles as that described and claimed in Plummer application, Serial No. 333,081, filed May 3, 1940 now matured into Patent 2,373,413 of April 10, 1945. The inner end of line 18 is fixedly tied or otherwise secured to the surface of drum 61 by a releasable coupling (not shown), which breaks in the event the drum becomes entirely unwound and excessive force is applied to the line 18.

The drum 61 is fixedly carried by a shaft 62 journaled at one end in a bearing 63 mounted in the frame member 50 and provided with a seal 65 and a cover 66. The drum 61 includes a cylindrical rim 67 connected by a web 68 to a hub 69 and has at one end a retaining flange 71. A second retaining flange 72 is attached to the rim 67 as by bolts 73. The drum 61 is suitably secured against axial or angular displacement on the shaft 62 and abuts a positioning shoulder 74. Annular extensions 70 are secured to flanges 71 and 72 to provide for desired number of turns of line 18.

A brake plate 75 is attached to and carried by the drum 61. The brake plate 75 is provided with a plurality of circumferentially spaced lugs 76 which are set in notches 77 formed in lugs 78 which extend inwardly from the cylindrical portion 67. The plate 75 thus is capable of moving axially but is locked against angular movement relative to the drum 61.

The brake 80 cooperates with the brake plate 75 and includes a driving brake disc or frame 81 having a suitable friction lining 82 secured to its face and adapted to bear against the brake plate 75. The brake disc 81 is carried by (and in the present embodiment is integral with) a hub 83 which carries a bearing 84 mounted on the shaft 62 and retained by a ring 85.

The hub 83 has a journal and bearing portion 86 which receives a bearing 88 positioned by a ring 91. A sleeve 89 abutting a shoulder 90 on the shaft assists in positioning the bearing 88 on the shaft 62. The bearing and journal portion 86 is itself journaled in a bearing 87 mounted in frame 50 and secured by a ring 205. Thus the bearing 87 constitutes with the bearings 63 the main bearings for supporting the shaft 62 rotatably in the frame 50.

Cooperating with the brake disc 81 is a complementary brake disc or shoe 92 of annular form having frictional lining 93 on its face bearing against the brake plate 75. The brake disc 92 is resiliently urged lightly toward the brake plate 75 by three annularly disposed bolts 210 extending through the brake disc 92, the interior opening of the ring 75 and through a suitable opening in the brake disc 81. Bolts 210 carry springs 212 bearing against the brake disc 81 and against an adjusting nut or nuts 213.

Extending from the brake disc 92 is a plurality (in the present case three) of studs 94 which extend through openings in the brake disc 81. Pivotally connected to each stud 94 by a pivot pin 95 is an operating lever 96 which carries at the end of its shorter arm a roller 97 adapted to bear against a boss 99 projecting from the adjacent face of the brake disc 81. The long arm end of the actuating lever 96 is pivotally connected as by a pivot pin 109 to a socket 101 attached to an actuating rod 102 which extends through the journal and bearing portion 86. The actuating rod 102 is connected by a spring 103 to a stud 104 which is threaded into a disc 105.

Upon movement of the disc 105 (effected in a manner hereinafter to be described) in a direction away from the brake disc 81 (to the right as viewed in Fig. 4) the actuating rods 102 are moved in a similar direction to thereby rock the levers 96 causing the rollers 97 to bear upon their respective bosses 99 and to clamp the brake disc 92 and the brake disc 81 against the brake plate 75. Owing to the lug and notch connection between the brake plate 75 and the drum 61, the brake is thereby permitted to shift axially and allow the clamping action to take place.

In order to cause the actuating disc 105 to move outwardly and to apply the brake 80 upon a predetermined number of revolutions of the drum 61, an automatic brake actuating mechanism is provided which will now be described.

The disc 105 is not-rotatably connected to the journal and bearing member 86 by a stud 110 which extends through the disc 105 and is threaded into the member 86. The disc 105 is mounted on a collar 111 having a flange 112 at one end and a ring 113 at the other end, the disc 105 and collar 111 being thus permitted to have relative axial sliding movement which is limited in extent by the flange 112 and ring 113.

The collar 111 is adjustably threaded onto an outer sleeve 114 and is positioned non-rotatably thereon by a spring 115 adapted to enter into any one of a plurality of circumferentially spaced, axially extending notches or slots 116. The spring 115 can be raised out of its notch and the collar 111 turned in the outer sleeve 114 to adjust the axial position of the collar 111 and thereby adjust the time at which the flange 112 strikes against the disc 105.

The outer sleeve 114 is threaded onto an inner sleeve 117 by large screw threads which permit the sleeve 114 to turn on the inner sleeve 117 and to be advanced thereby in an axial direction. The inner sleeve 117 is non-rotatably secured to the shaft 62 as by a key 118.

Movement of the sleeve 114 on the inner sleeve 117 is limited by a flange 119 at the inner end of the inner sleeve 117 and by a ring 120 non-rotatably secured on the shaft 62 as by a key 121 and a nut 123 and abutting the outer end of the sleeve 117. In order to permit axial movement of the outer sleeve 114 on the inner sleeve 117, a recess 124 is formed in the outer sleeve 114 of sufficient diameter to accommodate the ring 120. For the purpose of manually turning the outer sleeve 114 (for resetting purposes hereinafter described), a flange 122 is provided at its outer end having sockets 125 for a spanner.

In order to provide a suitable braking action or drag on the outer sleeve 114 to prevent it from rotating except when desired, a friction brake may be provided. The friction brake includes brake ring 130 which surrounds the outer sleeve 114 and preferably seats in a circumferential groove 134 to prevent displacement of the ring 130, a suitable brake lining 133 being provided. The brake ring 130 is formed with a lug or extension 131 having an opening through which the stud 110 loosely passes whereby the brake ring is non-rotatably connected to the member 86.

For controlling the winch 25 suitable gearing (Fig. 3) is provided between the hand lever 26 and the gear 150. This gearing comprises a gear 28 mounted upon a shaft 29 also journaled in the framework 50. Shaft 29 has a second gear 30 meshing with a gear 31 mounted on shaft 32 also journaled in the framework 50. Shaft 32 also has mounted thereon a ratchet wheel 33 controlled by pawl 34 secured to pivoted spring-pressed pedal 27. Pawl 34 normally engages ratchet 33 and is only disengaged therefrom when the operator depresses pedal 27.

The handle 26 for operating the winch 25 is also journaled on shaft 32 and carries a pawl 35 also engaging ratchet wheel 33. Pawl 35 is controlled by a link 36 connected to spring-pressed thumb lever 37 which normally holds the pawl 35 in engagement with the ratchet 33. It will be understood that pawl 35 may be disengaged from ratchet wheel 33 by moving thumb lever 37 toward handle 26.

It will thus be seen that, when thumb lever 37 is pressed against its spring and when the foot engages pedal 27, the drum 61 is absolutely free to unwind line 18. To wind up line 18 on the drum 61, foot pedal 27 is released and thumb lever 37 is released, and the pilot works lever 26 back and forth, winding up line 18. The gearing 28, 30 and 31 steps up the movement of drum 61 by hand lever 26 to reduce the number of strokes of hand lever 26 to reel in drum 61.

The automatic operation of the winch 25 is as follows. This occurs when force is applied to line 18 as during pick-up operations described hereinafter. During the pick-up operations the brake support 80 is held stationary by pawls 34 and 35.

Upon the initial rotation of drum 61 with respect to brake support 80, the auxiliary friction applying devices 210, 212, 213 apply relatively light friction. As the drum 61 rotates, the machine threads on sleeves 117, 114 cause the sleeve 114 to move outwardly, to the right in Fig. 4; shoulder 112 then engages ring 105 which applies force to springs 103. As sleeve 114 travels further to the right in Fig. 4, force continues to be built up in springs 103 and correspondingly more force is applied to friction discs 92, 75 and 81. The force applied to the brake discs continues to increase until sleeve 114 abuts collar 129 which limits the build-up in friction to the set maximum amount, after which the drum 61 may continue to pay out line 18 but with constant maximum set friction.

The following illustrates one manner of operating and adjusting the automatic winch 25 prior to the picking up opertaion. Thumb lever 37 and foot pedal 27 are depressed to permit free paying out of line 18 to the desired extent.

After paying out the desired amount of line 18 to give the desired initial slack, the thumb lever 37 is released, the hand lever 26 is permitted to rest against stop 38, and the pilot's foot is removed from pedal 27. This permits both pawls 34 and 35 to hold the brake support 80 stationary. The nuts 213 are adjusted to give the desired initial light braking effort to the drum 61. The sleeve 114 is adjusted with respect to sleeve 117 to control the maximum braking effort it is desired to impart to the winch for the picking up operation (the sleeve 114 having had its shoulder brought against collar 120 by a previous pick-up operation). The sleeve 111 is adjusted on the sleeve 114 to adjust the clearance between ring 105 and shoulder 112 to determine the number of relatively free revolutions the drum 61 will make before starting to build up pressure on the springs 103.

*Operation*

The pick-up operation will be described first with respect to the system illustrated in Figs. 1 and 2, wherein a towing plane in flight picks up a grounded glider. The pick-up hook 11 will be let down to the position somewhat as shown in Fig. 1 and the plane 10 will approach the ground station 13 with the purpose of engaging the upper ply of ground loop 17 with the boom 11 above hook 12. The airplane, instead of flying at right angles to the plane of the poles 14, preferably flies at an angle to this surface to better enable the glider to clear poles. The glider is also located at some distance from the poles and out of line with a perpendicular extending from the plane of the poles and between the poles to give sufficient leeway for the glider to clear the poles. The line 18 passes around anteriorly of the pole 14 to prevent fouling with the pole, as shown in Fig. 1.

After the hook 12 engages ground loop 17, it first takes the slack out of the ground loop and out of the line 18, then stretches the loop 17 and line 18, this stretch applying a force to the winch 25 to overcome its inertia. The stretch in the material of the ground loop 17 and of line 18 affords time to permit the winch 25 to get rotating up to speed and the long elastic memory of this material avoids any slingshot or rebound caused by the energy stored up in the stretched lines 17 and 18 suddenly releasing. The operation of the nylon line and its cooperation with the automatic winch is described and claimed in Plummer application, Serial No. 423,999, filed December 22, 1941.

The initial relatively free revolutions of the drum 61 assist in getting this drum up to speed and, after the drum gets up to speed, the automatic brake gradually applies braking friction to build up the braking force to the maximum amount for which the winch is set. This applies a controlled accelerating force to the glider; the paying out of the winch 25 provides the necessary time interval in which to accelerate the glider from zero to the speed of the towing plane and the limited maximum force exerted by the brake imparts the necessary accelerating force to the glider.

After the glider has been accelerated to the speed of the tow plane, the glider pilot may maneuver the glider into towing position. Since the amount of line payed out for the pick-up operation may be more than necessary or desirable for simple towing, the glider pilot may operate his winch to shorten the line.

In case it is desired to launch a series or train of gliders by the same towing plane while in flight, this may be done in two different ways. It may be done by attaching the gliders, one at a time, to a ground loop and picking up the gliders by repeated passes of the tow plane over the ground station. Or, it may be done by connecting the entire series of gliders simultaneously to a single ground loop and picking up the entire series of gliders by one pass of the towing plane.

Figure 2:
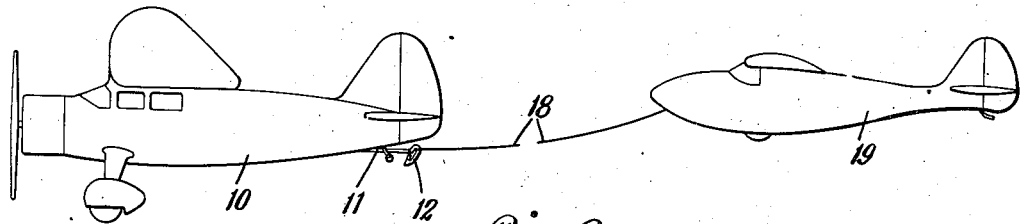
Fig. 2 is a diagrammatic view illustrating a position the glider may assume after it has been picked up and is being towed by the tow plane.

In carrying out the first method of launching a plurality of gliders, the first glider is launched as described above and illustrated in Fig. 1 and the glider is towed as illustrated in Fig. 2. Means man be provided for disconnecting the tow line 18 from the hook 12 and attaching the tow line to a desirable connection on the towing plane 10. The pick-up arm or boom 11 is then lowered to the position shown in Fig. 1 preparatory for the second pass to pick up the second glider. The second glider is connected to a second ground loop 17 on the same or similar ground poles 14 and the same towing plane 10 passes over and between the poles 14 and the hook 12 engages the upper ply of the second ground loop 17, launching the second glider 19 in a manner very similar to the launching of the first glider 19. However, the pilot of the first glider will so manipulate his glider during the pick-up of the second glider as to reduce the drag of the first glider on the tow plane during the picking up operation so as to make available all of the power of the towing plane for the picking up of the second glider. After placing the second glider in flight, the line 18 will be disengaged from the hook 12 and the point of connection transferred to a desirable connection on the towing plane 10 the same as with the first glider, leaving the pick-up arm 11 free for picking up the third glider. The third glider will be picked up in the same way as the first and second gliders, provided that during the pick-up of the third glider the pilots of both the first and second gliders will manipulate their gliders to reduce the drag of the gliders on the towing plane during the pick-up operation. Thus, any number of gliders may be picked up from the same ground station or similar ground stations by repeated passes of the same tow plane. After all of the gliders are launched, the glider pilots will manipulate their winches and otherwise maneuver to take any desired flight formation, one formation being illustrated in Figs. 6 and 7 wherein Fig. 6 illustrates a plan view and Fig. 7 an elevation of the formation.

While the operation has been described as contemplating a series of separate approaches for each pick-up, it is understood that the ground stations may be so arranged as to permit a series of pick-ups on one approach. Further, a glider train may be built up from different fields as the plane proceeds on its course.

Figure 5:
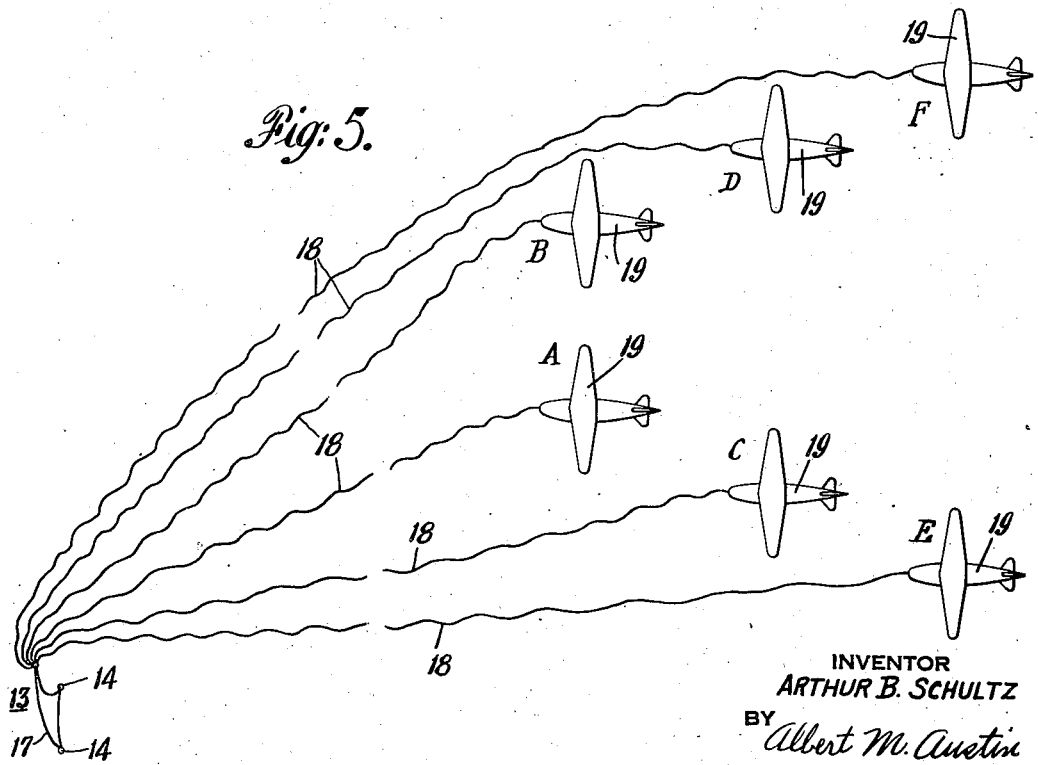
Fig. 5 illustrates one manner in which a series of gliders may be picked up from the same ground station by the same tow plane.

To pick up the entire series of gliders by a single pass of the tow plane over the ground station 13, a single ground loop 17 supported by poles 14 may be provided and the several gliders to be launched will be arranged on the field of the ground station in some such manner as illustrated in Fig. 5, the several gliders being indicated A, B, C, D, E and F. Each glider will have its separate connecting line 18 connected to the same ground loop 17. The gliders will preferably be located to one side of the space defined by lines extending from the poles and perpendicular to the plane thereof, and the loop 17 and lines 18 will pass interiorly of the poles 14 as indicated; and the tow plane will fly at such an oblique angle to the plane of the poles as not to foul the lines.

The several connecting lines 18 will have slack corresponding to the order in which the gliders are to be launched. The glider having the minimum slack line (for example A) will be launched first, the glider having the second least slack line (for example B) will be launched second, and so on. As the tow plane 10 engages the ground loop 17, the slack will first be taken out of the line to glider A and that glider launched in very much the same way as launching a single glider from the same ground station. The several lengths of connecting line 18 will be so arranged that after the first glider has obtained flying position, the slack in the tow line of the second glider to be launched will be taken up and the launching force will be exerted on it. During the launching of the second glider B, the pilot of the first glider will maneuver his glider in such way as to reduce the drag of the first glider on the towing plane. After the second glider is launched, the slack in the line connecting the third glider C will be taken up and the third glider will be launched in the same way as the other two, except that during the launching operation of the third glider, the pilots of the first and second gliders will maneuver their gliders in the air to reduce their drag on the towing plane and so on. This launching technique is followed until all of the gliders are launched, after which each glider pilot will maneuver his glider to the desired formation operating his winch to take up the slack and otherwise manipulate the controls to put his glider in the proper position, one of such formations being illustrated in Figs. 6 and 7.

The gliders may also be launched by a tow plane starting from rest on the ground. As done heretofore, this would have required a relatively large airport as the drag of the glider would be on the airplane during its entire period of acceleration. By the present method the glider drag does not come on until the airplane has reached flying speed or approximately flying speed.

Referring to Fig. 8, the single glider 19 is connected to tow plane 10 by a line 218, this line having sufficient slack for the launching operation. The tow plane 10 may actually be located considerably in back of glider 19 instead of as shown. The tow plane 10 is taxied along the field until it obtains the speed at which it is desired to launch the glider. Gliders are customarily designed to fly at a considerably lower speed than power planes. Large gliders, for example, will require a speed of say 50 M. P. H. to fly while smaller gliders will fly at lower speeds. Tow planes, on the other hand, will generally require a great deal higher speed. Further, the heavier tow plane requires a greater run to accelerate to its flying speed than does the glider. Thus, the glider may start to fly while the towing plane is still on the ground. The tow plane, still taxiing, will further accelerate its speed until it reaches a speed high enough to permit it (the tow plane) to fly, at which time the glider pilot will manipulate the glider in such way as to reduce drag of the glider on the tow plane. The tow plane will then start to fly and accelerate above its critical speed. After the tow plane reaches safe flying speed, the glider pilot will maneuver the glider back into towing position.

To launch a series of gliders by the same tow plane starting from rest on the ground, the additional gliders will be connected to the same tow plane 10 by additional lines 218 of sufficient length to permit the gliders to take off, one at a time. If desired, all of the several gliders may be accelerated to flying speed in succession, before the tow plane leaves the ground, each glider pilot manipulating his glider to reduce the glider drag on the tow plane while another glider is being accelerated to flying speed and all of the glider pilots manipulating all of the gliders to reduce the glider drag on the tow plane while the tow plane is taking off from the ground and attaining its critical flying speed. After the tow plane attains safe flying speed, the pilots of the several gliders will maneuver them into towing position in any desired formation as, for example, the formation illustrated in Figs. 6 and 7.

In some cases, it may be desirable to permit the towing plane to attain safe flying speed after launching the first glider, after which the second and successive gliders will be launched, one by one, while the tow plane is flying at above its critical speed. With this launching technique, as in the previous launching techniques, the pilot of each glider already launched will maneuver his glider to reduce the glider drag from the tow plane while another glider is being launched.

Thus, glider launching systems have been described which are useful both for war and for peace. The gliders may comprise single place gliders or multi-place troop transports or cargo carrying gliders. The methods utilizing the ground station and the ground loop are of advantage where the fields are so small as not to provide space to accelerate an entire glider train from rest to flying speed by means of an airplane taxiing on the ground. The location of the winch in the glider permits the pick-up of a plurality of gliders by the same tow plane and permits each glider pilot to manipulate the winch of his glider as required by the particular plan of pick-up and the particular towing formation. The use of nylon line for both the ground loop and connecting line gives sufficient time in which to overcome the inertia of the winch and the automatic brake on the winch gradually applies accelerating force to the glider to give the desired rate of acceleration. The nylon, having a long elastic memory, does not immediately return the energy stored up in it by its stretch due to the initial stress, but returns this energy gradually without causing any over-shooting or slingshot action.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a glider launching system, a plurality of stationary gliders to be launched, line pay-out devices in said gliders, a tow plane, and separate lines individually connecting said tow plane and the several pay-out devices.

2. In a glider launching system, a plurality of stationary gliders to be launched, line pay-out devices in said gliders, a tow craft, and lines connecting said tow craft and said pay-out devices.

3. The method of launching a plurality of gliders by the same craft, which comprises establishing connection between said craft and said gliders, imparting motion to said craft, arranging said connections to exert accelerating force on said gliders, one at a time, and manipulating the launched gliders to reduce drag of the gliders on the tow plane while launching an additional glider.

4. The method of launching a plurality of gliders by the same tow plane, which comprises establishing connection between said plane and said gliders, arranging said connections to exert accelerating force on said gliders, one at a time, and manipulating the launched gliders to reduce drag of the gliders on the tow plane while launching an additional glider.

5. In a pick-up apparatus for picking up a plurality of grounded gliders by an aircraft in flight, a ground station comprising a releasable ground loop, a plurality of gliders on the ground, line pay-out winches on the several gliders, lines individually connecting said loop and said winches, a pick-up plane and means on said plane for engaging said ground loop as the plane flies over said ground station.

6. The method of launching a series of gliders by the same flying tow plane, which comprises locating the plurality of gliders on an airfield, providing a pick-up device on said field and connecting said pick-up device by progressively increasing lengths of line to the several gliders, flying the tow plane over the field, engaging said pick-up device by said tow plane and thereby accelerating the first glider to flying speed, manipulating said first glider to reduce the drag thereof on the tow plane as the tow line to the second glider tightens and thereby accelerates the second glider to flying speed, manipulating both said first and second gliders to reduce the drag thereof on said tow plane as the tow line to the third glider tightens and thereby accelerates said third glider to flying speed, repeating the sequence of steps until all of the gliders in the series are launched, and thereafter simultaneously towing all of said gliders by said tow plane.

7. In a glider pick-up system comprising a ground station having a releasable loop, the method of launching a plurality of gliders which comprises connecting a first glider to said loop, engaging said loop by a tow plane passing over the ground station and thereby launching the glider, connecting a second glider to a second loop and engaging said second loop by said same tow plane as it passes over said ground station and thereby launching said second glider, and manipulating said first glider to reduce the load thereof on the tow plane while picking up said second glider.

8. The method of launching a plurality of gliders by a plane initially at rest, which comprises connecting lines from said plane to said gliders, operating the plane to launch said gliders, one at a time, arranging both the unlaunched gliders and those already launched to reduce their drag on the tow plane while a glider is being launched.

9. In pick-up apparatus for picking up a glider by an aircraft in flight, a ground station comprising a releasable ground loop, a glider, an automatic winch in said glider, said winch comprising a frame, a reel journaled in said frame, a line wound on said reel, a brake support also journaled in said frame, variable braking devices between said reel and said support, means for putting said braking devices into operation by unwinding said line from said reel, a hand lever and means for manually winding said line on said reel by operation of said hand lever.

10. In an aircraft launching system, a first or launching aircraft, a second aircraft to be launched, an automatic winch in said second aircraft, said winch comprising a frame, a reel journaled in said frame, a launching line wound on said reel and connected to the launching aircraft, a brake support also journaled in said frame, braking devices between said reel and said support operable to provide variable braking effect, and means for putting said braking device into operation where by unwinding said line from said reel is effective to produce increased braking effect.

ARTHUR B. SCHULTZ.